United States Patent [19]

Terashita

[11] Patent Number: 4,646,252
[45] Date of Patent: Feb. 24, 1987

[54] COLOR FILM INSPECTION METHOD

[75] Inventor: Takaaki Terashita, Kaisei, Japan

[73] Assignee: Fuji Photo Film Co., Ltd., Kanagawa, Japan

[21] Appl. No.: 545,196

[22] Filed: Oct. 25, 1983

[30] Foreign Application Priority Data

Nov. 11, 1982 [JP] Japan .................. 57-198230

[51] Int. Cl.⁴ .......... G02B 27/02; G06K 9/68; G01J 3/46
[52] U.S. Cl. .................. 364/525; 355/77; 356/443; 356/425; 382/1; 382/34; 358/80
[58] Field of Search ........... 364/525, 519, 520, 526; 382/17, 42, 50, 34, 1; 356/404, 425, 443, 444; 355/77, 34; 358/80, 81, 54

[56] References Cited

U.S. PATENT DOCUMENTS

| | | | |
|---|---|---|---|
| 4,005,281 | 1/1977 | Faulhaber et al. | 364/525 X |
| 4,217,648 | 8/1980 | Thurm et al. | 356/404 X |
| 4,293,215 | 10/1981 | Rosborough, Jr. et al. | 355/77 X |
| 4,339,517 | 7/1982 | Akimoto | 355/77 X |
| 4,414,566 | 11/1983 | Peyton et al. | 382/42 X |
| 4,418,360 | 11/1983 | Glasgow | 358/54 X |
| 4,449,240 | 5/1984 | Yoshida | 382/50 X |

FOREIGN PATENT DOCUMENTS 54-26729  2/1979  Japan .

Primary Examiner—Errol A. Krass
Assistant Examiner—Joseph L. Dixon
Attorney, Agent, or Firm—Wenderoth, Lind & Ponack

[57] ABSTRACT

In printing color films, a color negative film has to be evaluated to determine the amount of exposure. A color balance adjusting apparatus has hitherto been used for appraisal. In the prior art, however, as all the picture images of a color negative film are displayed on a monitor TV for appraisal, it has a demerit in that a speedy inspection cannot be carried out. In addition, as the film picture images are displayed through CRT images of a monitor TV, it is hard on the eyes compared with that by direct visual observation and, therefore, presents a drawback in processing capacity. Accordingly, this invention aims at providing a method which greatly improves the processing capacity of inspecting the color films.

12 Claims, 3 Drawing Figures

COLOR FILM INSPECTION METHOD

BACKGROUND OF THE INVENTION

This invention relates to an inspection method during printing of a color film of an elongated or disk type.

In printing color films, a color negative film has to be evaluated to determine the amount of exposure needed. A color balance adjusting apparatus as shown in FIG. 1 has hitherto been used for appraisal, wherein the light from lamps 11 to 13 in a light source unit 10 irradiates a color negative film 1 which is being fed in, for example, the direction N on the light source 10; the light transmitted through the negative film 1 is received by a color TV camera 2, and picture images of the negative film 1 are successively monitored by a monitor TV 3 to appraise the negative images. The luminance of the lamps 11 to 13 are respectively adjusted by a dimmer 4 and a potentiometer 5 connected thereto, and resolution/color filters 14, 15 and 16 for red (R), green (G) and blue (B) are placed between the lamps 11 to 13, respectively, and the color negative film 1 which is being fed above the lamps 11 to 13. Therefore, the luminance of R, G and B can be changed in accordance with the luminance adjustment for the lamps 11 to 13, whereby an operator can obtain an appropriate quality of the picture on the monitor TV 3.

In ordinary cases the color negative film 1 is printed on color photosensitive paper. However, when a color negative film 1 is judged for the color density balance, the negative film should be judged as it is. Since the negative image can easily be inverted to a positive one by using an electric circuit in the color TV camera 2, the operator can easily observe the color positive image by the monitor TV 3. The above mentioned structure makes the adjustment simple.

In the prior art inspection method for a color film, since all of the picture images of a color negative film are displayed on a monitor TV for appraisal, it has a disadvantage in that a speedy inspection cannot be carried out. In addition, since the film picture images are displayed through CRT images of a monitor TV, it is hard on the eyes as compared with a direct visual observation and, therefore, presents a drawback in processing capacity.

SUMMARY OF THE INVENTION

Accordingly, an object of this invention is to provide a method which greatly improves the processing capacity of inspecting color films.

Another object of this invention is to provide a speedy inspection procedure by determining similar picture images and grouping the images instead of separately appraising all of the images of the color films.

The nature, principle and utility of the invention will become more apparent from the following detailed description when read in conjunction with the accompanying drawings.

DETAILED DESCRIPTION OF THE INVENTION

This invention concerns a color film inspection method in printing a color film of an elongated or disk type which comprises displaying picture images of the color film on a display unit (for instance a CRT display), evaluating the color and the density thereof and correcting them. The inspection method particularly aims at raising the processing capability in the color film inspection by judging the similarity of the picture images of the color film, and grouping similar picture images, and automatically displaying only a limited number of the picture images within a group thereof for evaluation.

The similarity of picture images in a color film can be determined in accordance with the method, for instance, disclosed in Japanese Laid-open No. 26729/1979 (which is described hereinafter) wherein a frame of picture images is and compared with the preceding frame by using a video signal from a color TV camera.

Figure 1:
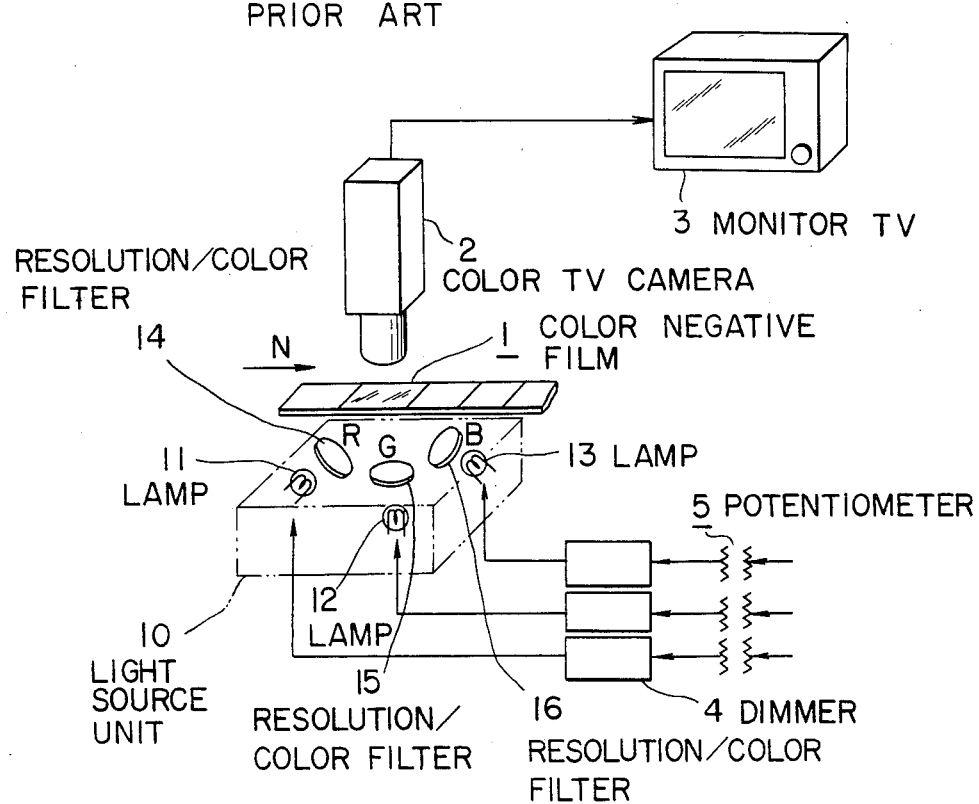
FIG. 1 is a schematic view of the inspection apparatus for a color film in prior art.
Figure 2:
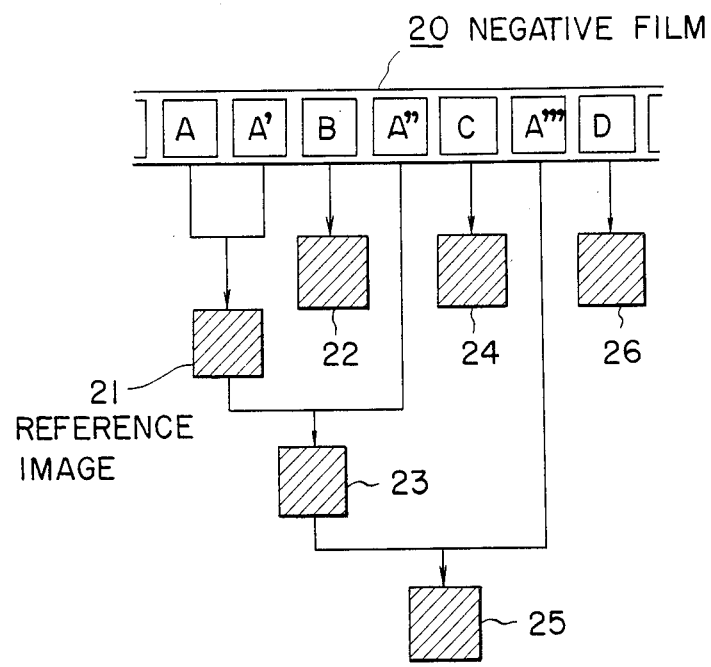
FIG. 2 is an explanatory view of the method of determining the similarity which is applicable to this invention.

The following method of determination may also be used. An example is given in FIG. 2 for successively determining images A to D of the negative film 20 to facilitate understanding. The first frame A is set as a reference image and a similarity to the following frame A' is evaluated according to a formula which is described hereinafter, and these determination signals, for example, of 5 steps, i.e. S1, S2, S3, S4 and S5 are outputted. Frames A and A' are regarded as similar (or identical) if the signals S1 to S5 exceed a prescribed value (for example S3), and the mean characteristic data of frames A and A' are set as a new reference image 21. The value can either be the mean of the 2 frames or the weighted mean corresponding to the number of the frames. Then similarity based on the comparison between this newly established reference image 21 and the next frame B is obtained. When its determination signal is S2 or less, the picture image of this frame B is stored as another reference image 22. Then a similarity to the subsequent frame A" is calculated by comparing it to the previously stored reference images 21 and 22, respectively. Since the frame A" is similar to the reference image 21, the mean value of frame A" and the reference image 21 is obtained by an averaging process to form a new reference image 23 for memory.

A next step is the calculation of a similarity of frame C to the previously obtained reference images 21 to 23. Since the determination signal of frame C is below S2 with respect to the reference images 21 to 23, the image is stored as a new reference image 24. The same procedure is carried out for the images of frames A" and D to form new reference images 25 and 26 in this example. When a plural number of reference images are determined to be as similar, the picture image of the highest similarity of all is acknowledged as the similar image and a new reference image is formed.

The following are considered as characteristic amounts for determining the similarity of images: the maximum density of image $D_{max}$, the minimum density $D_{min}$, the difference between red and green densities $(D_R-D_G)$, the difference between green and blue densities $(D_G-D_B)$, the mean density $\overline{D}$ of the total and divided picture images, contrast, histogram of hue or density, spatial frequency distribution, the shape of the image converted into an N value, etc.

Similarity X is calculated according to the following equation:

$$X = K_1 + K_2\{|\Delta RG| + |\Delta GB|\} + K_3\{|\Delta UL| + |\Delta RL|\} + K_4|\Delta CP| + K_5|\Delta DB| \quad (1)$$

wherein $K_1$ to $K_5$ = constants, $$|\Delta RG| = |(LATD'_{(R)} - LATD'_{(G)}) - (LATD_{(R)} - LATD_{(G)})| \quad (2)$$

$$|\Delta GB| = |(LATD'_{(G)} - LATD'_{(B)}) - (LATD_{(G)} - LATD_{(B)})| \quad (3)$$

$$|\Delta UL| = |(DL' - DU') - (DL - DU)| \quad (4)$$

$$|\Delta RL| = |(DRI' - DLF') - (DRI - DLF)| \quad (5)$$

$$|\Delta CP| = \left| \left( \frac{D'_{min} + D'_{max}}{2} - LATD'_{(N)} \right) - \left( \frac{D_{min} + D_{max}}{2} - LATD_{(N)} \right) \right| \quad (6)$$

$$|\Delta DB| = \left| \frac{\Sigma|D'_{i+1} - D'_i|}{n} - \frac{\Sigma|D_{i+1} - D_i|}{n} \right| \quad (7)$$

This is the mean value of the density difference of the adjoining measurement points which indicates an average contrast of the whole image. The reference letters $LATD_{(N)}$, $LATD_{(R)}$, $LATD_{(G)}$ and $LATD_{(B)}$ denote the large area transmittance densities for neutral gray, red, green and blue, respectively; $D_{min}$ and $D_{max}$ denote the minimum and the maximum densities for neutral gray, respectively; and DC, DF, DU, DL, DRI and DLF denote the mean densities for central, peripheral, upper, lower, right side and left side parts of the image plane, respectively. The characteristic values with an apostrophe represent those of the preceding frame or of a reference image. The values without an apostrophe denote a frame subject to a determination as to whether it is identical to the preceding frame or the reference image.

When a determination signal S exceeds a prescribed value $\alpha$ (signal S3 in the above example) in the determination equation (1) mentioned above, the preceding and the subject frames are regarded as similar. This can be illustrated by the following relationship:

$$\begin{cases} S \geq \alpha \rightarrow \text{similar frame} \\ S < \alpha \rightarrow \text{different frame} \end{cases}$$

Both the predetermined value $\alpha$ and the degree of similarity for determination signals may be arbitrarily selected.

Stated in other terms, one roll of negative film generally includes plural frames of similar scenes. Those similar scenes should preferably be printed at the same density. They are usually similar in place, incident, object and background but different in angle, or details such as the position or size of objects or arrangement of the scene. Most of the similar frames are taken by a photographer successively but sometimes they are interposed with an entirely different frame.

Similarity can be determined by comparing adjacent frames. The method of the present invention can certainly contribute to an improvement in the determination precision. But the similarity cannot effectively be determined by comparing images of adjacent frames macroscopically (e.g. in terms of average density of the frame) nor microscopically (e.g. in terms of density in pixels). The experimental result indicates that such similarity can sufficiently be determined in terms of the color and structure of images. The image colors of different frames can be determined in terms of their difference on color coordinates. More specifically, it is assumed that the difference of colors on color coordinates having the red density—green density and green density—blue density as coordinate axes can be expressed simply as $(|\Delta RG| + |\Delta GB|)$. The value becomes zero in comparison of the same images but becomes large in comparison of the image frame of blue sky with the image frame of snow scene.

There are several factors for expressing the structure of images; the difference in average density between the upper half and the lower half of a frame (UL), the difference in average density between the left half and the right half of a frame (RL), the value which expresses a frame is predominantly of shadow portion or of highlight portion $$\left( \frac{D_{min} - D_{max}}{2} - LATD_{(N)} \right),$$

provided $LATD_{(N)} = (LATD_{(R)} + LATD_{(G)} + LATD_{(B)}) \times \frac{1}{3}$)

or DB which shows whether the frame includes an area of low contrast, e.g. sky, sea, wall etc. or an area of high contrast, e.g. the picture taken with strobe light or woods. In order to enhance precision in the determination, the number of factors expressing the structure of images should increase. The factors are, for example, neutral colors, the areas of read, green and blue in images, the density of central area or the density of peripheral areas. These values indicate the structure of images. Even if the angle of a camera is slightly shifted, the value will not change widely. In order to compare two images, absolute value of the difference between values of two images such as $|\Delta UL|$, $|\Delta RL|$, $|\Delta CP|$, $|\Delta DB|$, etc. should be checked. The similarity can be determined by comparing such absolute values and if there is at least one factor which exceeds the value of another frame, the frames are determined to be dissimilar. But if a slight variation is to be ignored, these values should be evaluated comprehensively. For instance, if the angle of the camera is shifted up or down very slightly, the absolute value $|\Delta UL|$ will increase by a large margin.

For higher precision in the similarity determination, a primary expression combining the value expressing the difference in color of two images and the value expressing the difference in structure of two images is used as a discriminant expression. The discriminant expression can be obtained by discriminant analysis which is a statistical means for multivariate analysis. According to the discriminant analysis, coefficients of the expression (1) which discriminate images are similar as follows:

$K_1 = -0.506$, $K_2 = 4,700$, $K_3 = 3.217$, $K_4 = 4.939$, $K_5 = 20.515$

The coefficients of the expression (1) which discriminate that images are not similar are as follows:

$$K_1 = -1.765, K_2 = 6.639, K_3 = 7.014, K_4 = 8.300,$$
$$K_5 = 36.328$$

The values are analyzed according to the above coefficients and images are determined to be in either category having the higher value. Alternatively, instead of calculating by the above two expressions, the difference of the two expressions is obtained so as to have the result by only one expression. The coefficients thus obtained are:

$$K_1 = 1.259, K_2 = -1.939, K_3 = -3.797, K_4 = -3.361,$$
$$K_5 = -15.813, \alpha = 0.0$$

By lowering the value $\alpha$, it becomes possible to discriminate between images of high similarity and by increasing the value $\alpha$, it becomes possible to discriminate between images of low similarity, too.

The coefficients $K_1$ through $K_5$ are constants. They may assume different values depending on the sample population in discriminant analysis. The determination of similarity or dissimilarity, the determination of density (i.e. signal values in proportion to optical density thereof instead, spectral sensitivity characteristics of the optical system linearity of measured value, etc), but once the device to be used is determined, they can be treated as constants. The expression (1) can obviously be modified in a great number of ways. For instance, $[|\Delta RG| + |\Delta GB|]$ can be divided into separate terms, $|\Delta RG|$ and $|\Delta GB|$, and $[|\Delta UL| + |\Delta RL|]$ into $|\Delta UL|$ and $|\Delta RL|$. Either one of $|\Delta RG|$ and $|\Delta GB|$ may be replaced with $|\Delta RB|$ to thereby modify the expression to $|(LATD'_{(R)} - LATD'_{(B)} - (LATD_{(R)} - LATD_{(G)})|$. This invention is by no means limited to the expression (1).

As mentioned briefly in the embodiment of this invention, this method can be realized by storing the values representing the colors of images of a preceding frame in a memory and the values representing the structure thereof, and comparing the values of the frame in question with the above values for discrimination, and storing the values of the frame in question in memory, and displaying or rejecting the values, and proceeding to the next frame. Alternatively, if the values of the frame in question are determined to be similar to the preceding frame, the mean value of the values of similar images may be stored in a memory for the same purpose. As mentioned in relation to the embodiment of this invention, this method is not limited to an adjacent frame but is expanded to include other different frames.

Figure 3:
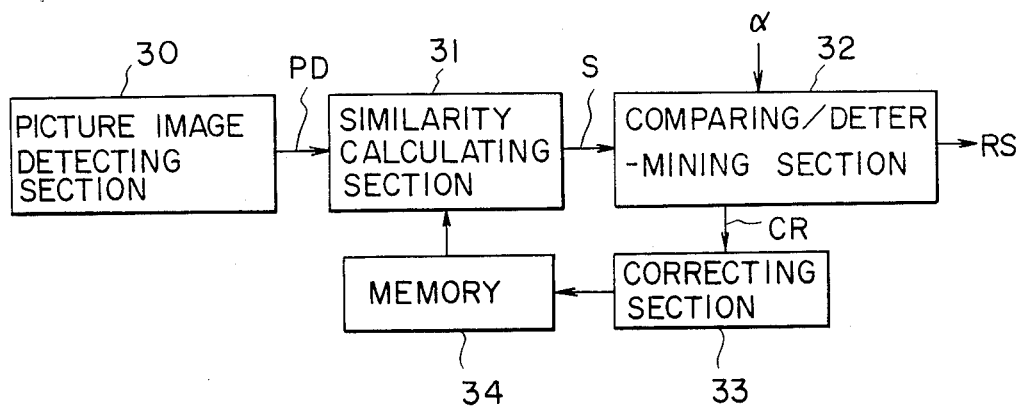
FIG. 3 is a block diagram of an embodiment of the apparatus which is used for the method.

FIG. 3 illustrates a device to embody the method according to the present invention wherein the characteristic detected at a picture image detecting section 30 is inputted to a similarity calculating section 31 as image data PD to be compared with the reference image data previously stored in a memory 34, whereby the similarity is calculated according to the aforementioned equation. Then, the signal S, indicating the degree of the similarity of both images and calculated by the similarity calculating section 31, is inputted to a comparing/determining section 32 where the signal S is compared with a prescribed value $\alpha$, and the result RS of the comparison is outputted. In the case where the signal S is larger than the prescribed value $\alpha$, a correction signal CR is transmitted to the reference image correcting section 33 where a correction for the reference image is performed. When the signal S is smaller than the prescribed value $\alpha$, they are judged not similar and the image value is stored in the memory 34 as a reference image.

On the multiple picture images of an elongated or disk type color film, similar images and different images are separated into groups as mentioned above and the frames regarded as similar are left out of the display process to a display unit (that is, the appraisal process). Even though one frame is omitted from the display, the display and appraisal of another frame of a similar image will sufficiently achieve the expected effect since they are already determined to be similar. In the case where multiple similar frames exist, a portion thereof may be indicated on a display in the interim.

The frame determined to be similar has its color and density corrected in a manner identical to the similar frame displayed on the display. In such an instance, the left half of the similar display can be used for displaying a reference image while the right half is used for an image to be corrected. If the display unit is provided with a color film automatic operation section (e.g. —Japanese Laid-open Pat. No. 62243/1981), the color and density of a frame may be automatically calculated in accordance with its similarity to the preceding frame as cited in Japanese Laid-open Pat. No. 153334/1981. When the color and density are corrected based on the appraisal of the image on the display, the same complementary amount in identical color and density is given to similar frames.

As described in the foregoing, according to the film inspection method for an elongated or disk type color film, when a film is printed, similar picture images of the color film are grouped and only a limited number of picture images within a group is displayed on a display, whereby the amount of display on the display unit is remarkably reduced and the processing capacity in the film inspection is drastically raised. For instance, when 10,000 frames of a color negative films were inspected by using the equation disclosed in Japanese Laid-open Pat. No. 26729/1979, 2,023 types of similar groups and 1,632 types of non-similar groups were obtained. This example shows that the number of picture images which should be subjected to the display for appraisal is reduced to one third of the original number of images, thereby increasing the processing capability by threefold.

What is claimed is:

1. A color film inspection method wherein picture images on an elongated or disk type color film are displayed on a displayed unit at the time of printing so that the color and density thereof are evaluated for correction, which comprises the steps of:

comparing image densities of two picture images of two frames of said color film;

determining a degree of similarity of said two picture images in accordance with said comparison;

classifying said picture images into a plurality of groups in accordance with the determined degree of similarity;

automatically displaying only a limited number of images, said limited number of images corresponding to representative images from each of said groups which are separated in accordance with their similarity;

estimating color/density of a displayed picture image by observing it; and correcting a picture image corresponding to said displayed picture image according to said estimation.

2. A color film inspection method as claimed in claim 1, wherein picture images from a group which are not displayed are corrected by an amount which is similar to a displayed picture image from the same group.

3. A color film inspection method as claimed in claim 2, wherein an amount of correction which is identical to that of a similar picture image for the previously displayed picture is provided for a non-displayed picture image.

4. A color film inspection method as claimed in claim 1, wherein said similarity determination is performed in respective films.

5. A color film inspection method as claimed in claim 1, wherein said determining step comprises the steps of; obtaining values representing differences in color between frames and values due to picture position information representing differences of picture images in accordance with measured data from two frames consisting of a previously determined frame and a present frame; and comparing results of a determination formula which is a first degree function of said values with predetermined constant values.

6. A color film inspection method as claimed in claim 5, wherein said picture image is displayed when said picture image is not determined to be similar to a previously displayed frame according to the determination formula.

7. A color film inspection method as claimed in claim 5, wherein said previously determined frame has a value representing the color of said previously determined frame and constitution of its picture image.

8. A color film inspection method as claimed in claim 7, wherein said value representing color of said previously determined frame and constitution of its picture image is a mean value of a value representing color and picture constitution of at least two picture images determined to be similar.

9. A color film inspection method as claimed in claim 1, wherein said similarity of picture images is calculated according to the following equation:

$$X = K_1 + K_2\{|\Delta RG| + |\Delta GB|\} + K_3\{|\Delta UL| + |\Delta RL|\} + K_4|\Delta CP| + K_5|\Delta DB|$$

wherein $K_1$ to $K_5$ = constants.

$$|\Delta RG| = |(LATD'_{(R)} - LATD'_{(G)}) - (LATD_{(R)} - LATD_{(G)})|$$

$$|\Delta GB| = |(LATD'_{(G)} - LATD'_{(B)}) - (LATD_{(G)} - LATD_{(B)})|$$

$$|\Delta UL| = |(DL' - DU') - (DL - DU)|$$

$$|\Delta RL| = |(DRI' - DLF') - (DRI - DLF)|$$

$$|\Delta CP| = \left|\left(\frac{D_{min}' + D_{max}'}{2} - LATD'_{(n)}\right) - \left(\frac{D_{min} + D_{max}}{2} - LATD_{(n)}\right)\right|$$

$$|\Delta DB| = \left|\frac{\Sigma|D'_{i+1} - D'_i|}{n} - \frac{\Sigma|D_{i+1} - D_i|}{n}\right|$$

and LATD denotes a large area transmittance density for a color; $D_{MIN}$ and $D_{MAX}$ denote the minimum and maximum densities for neutral gray, respectively; DC, DG, DU, DL, DRI and DLF denote the mean densities for central, peripheral, upper, lower, right side and left side parts of the image plane, respectively; $D_i$ and $D_{i+1}$ respectively denote density values at measurement points i and i+1 on a frame; and primed characteristic values represent those values of a preceding frame.

10. A color film inspection method as claimed in claim 9, wherein a result estimated by said display device to be identical to a frame of a film is fed to a photographic printer.

11. A color film inspection method as claimed in claim 1, wherein, when multiple images are determined to be similar by a similarity determination, identical color and density correction to the image displayed on the display device is performed on the picture images determined to be similar.

12. A color film inspection method as claimed in claim 11, wherein a references image is displayed on a part of said display device for observation of a picture image.

* * * * *